United States Patent [19]

Smith, Jr.

[11] 4,096,792
[45] Jun. 27, 1978

[54] CONTINUOUS COFFEE ROASTING APPARATUS

[75] Inventor: Horace L. Smith, Jr., Richmond, Va.

[73] Assignee: Smitherm Industries, Inc., Richmond, Va.

[21] Appl. No.: 628,915

[22] Filed: Nov. 5, 1975

[51] Int. Cl.² .......................... A23F 1/02; A23N 9/02
[52] U.S. Cl. ...................................... 99/355; 99/470; 99/471; 99/479
[58] Field of Search .......................... 99/467, 469-471, 99/474, 479, 355; 34/13, 20, 57 A, 129, 10; 426/443, 466-467; 165/60, 65; 432/85

[56] References Cited

U.S. PATENT DOCUMENTS

| | | | |
|---|---|---|---|
| 2,506,317 | 5/1950 | Rex | 62/57 |
| 3,009,689 | 11/1961 | Hinz | 34/173 |
| 3,329,506 | 7/1967 | Smith | 426/467 |
| 3,332,780 | 7/1967 | Smith | 34/10 |
| 3,763,766 | 10/1973 | Smith | 99/470 |

FOREIGN PATENT DOCUMENTS

| | | | |
|---|---|---|---|
| 2,460,594 | 10/1975 | Germany | 259/145 |

*Primary Examiner*—Harvey C. Hornsby
*Assistant Examiner*—Robert Pous
*Attorney, Agent, or Firm*—Strauch, Nolan, Neale, Nies & Kurz

[57] ABSTRACT

Coffee roasting apparatus having a first reactor in which green beans are roasted and a second reactor in which the roast is arrested and the beans cooled. Both reactors are capable of carying out the operations conducted in them in a continuous as opposed to batch-type manner. In both the roasting and cooling operations the beans are circulated in patterns which bring them into intimate and uniform contact with a process fluid to promote uniform and efficient heating and cooling of the beans.

16 Claims, 10 Drawing Figures

CONTINUOUS COFFEE ROASTING APPARATUS

This invention relates to coffee roasting and, more particularly, to novel, improved apparatus for roasting coffee by a continuous as opposed to batch-type process.

My prior U.S. Pat. Nos. 3,615,668 issued Oct. 26, 1971; 3,724,090 issued Apr. 3, 1973; 3,730,731 issued May 1, 1973; 3,763,766 issued Oct. 9, 1973; and 3,823,662 issued July 16, 1974, disclose novel systems for roasting coffee by a continuous process. Advantages of these systems include uniform treatment of the solids being processed, versatility, accurate process control, a high rate of heat transfer, and reduced power requirements.

In my previously disclosed systems the green beans are introduced into and discharged from a reactor or roasting vessel through devices designed to prevent the egress of roasting fluid and the ingress of air so that an atmosphere of controlled composition and/or an above-atmospheric pressure can be maintained in the reactor. The beans thus introduced into the reactor are formed into a bed with successive increments of the beans being confined to specific locations in the bed. This bed is displaced to move the beans from the location at which they are introduced to the location where they are discharged so that roasting can be carried out on the wanted, continuous basis.

As the bed is displaced, the beans are roasted by a heated fluid, which will typically be an inert gas such as nitrogen. The roasting fluid is directed upwardly through the bed, typically through inclined apertures in a stationary nozzle plate located in the lower reaches of the reactor. This causes the beans to circulate in a pattern which produces uniform and intimate contact between the fluid and the beans and a consequent uniform roasting of the beans.

Preferably, the bed of beans is alternately incrementally advanced and halted in moving the solids from the location at which they are introduced to the location where they are removed. For the reasons discussed in U.S. Pat. Nos. 3,730,731 and 3,763,766 this permits the solids to be introduced and removed from the bed while it is halted. As a result, the simpler feed and discharge devices disclosed in those patents can be employed.

Also, in the apparatus disclosed in these two later patents, the fluid circulation system is simplified; and the moisture content of the roasting fluid can be regulated without venting fluid from the system. This eliminates the loss of roasting fluid and sensible heat associated with venting, the hardware required for venting, and the hardware needed to eliminate pollutants from the vented fluid.

From the roasting vessel the roasted beans are transferred in these previously disclosed systems to coolers which may be of the character disclosed in my prior U.S. Pat. Nos. 3,332,780 issued July 25, 1967, and 3,447,338 issued June 3, 1969. In these reactors or coolers the roast is quenched or arrested by spraying a liquid into the reactor to rapidly reduce the temperature of the hot, roasted beans. Cooling is then continued, typically until the beans reach ambient temperature.

Cooling is effected in my previously patented apparatus by the same type of fluid-solids contact as roasting is in the reactors disclosed in my U.S. Pat. Nos. 3,615,668; 3,724,090; 3,730,731; 3,763,766 and 3,823,662 albeit an ambient temperature rather than heated process fluid is employed.

One advantage of this cooling technique is that there is a rapid circulation or turnover of the beans being cooled. As a result, there is uniformity of contact between the beans and the quenching liquid and between the beans and the fluid cooling medium. Also, again due to the rapid circulation, cooling of all of the beans starts virtually simultaneously and with all of the beans subjected to the same conditions. The result is that the beans are uniformly cooled. This is important because uniformity is a major goal in the roasting of coffee.

Another important advantage of the technique disclosed in the foregoing patents is that, because of the intimate contact between the beans and the fluid medium, the beans can be cooled to a temperature more closely approaching the ambient temperature of the fluid medium than has heretofore been possible in a cooling cycle of reasonable duration.

Also, the intimate contact of the fluid cooling medium and the quenching liquid with the beans promotes the transfer of heat from the beans to the quenching liquid and fluid medium and therefore reduces the time required to quench the roast, minimizing the danger of overroasting. The improved heat transfer characteristics also result in increased efficiency.

An additional, and important, advantage of cooling roasted coffee beans in the manner just described is that there is only a small pressure drop through the bed, making power requirements relatively low. This can result in substantial cost savings.

Yet another important advantage of cooling roasted coffee in accord with the principles developed in my issued patents results from the use of the same fluid medium to both circulate and cool the beans. This simplifies the cooling apparatus and eliminates the energy input required to effect circulation, reducing the cost of building, operating, and maintaining the cooling apparatus.

Still another important advantage of my earlier inventions is that the liquid sprayed onto the beans is rapidly evaporated as long as the bean temperature is above 212° F. in the case of a water spray, for example. Such evaporation is accomplished by conversion of sensible heat in the beans into latent heat of vaporization, which rapidly reduces the bean temperature by extracting large amounts of sensible heat from the beans.

I have now discovered that the advantages of my previously patented and above-discussed coffee roasting systems can be retained and still other advantages obtained by substituting for the roasters and coolers employed in them those disclosed in my copending applications Ser. Nos. 628,916 and 628,907 filed this date.

Specifically, the novel roasters and coolers disclosed in my issued patents have the disadvantage that the velocity of the roasting fluid through the roaster must be closely controlled. If the fluid velocity is too low the circulation of the beans relied upon to obtain uniform roasting will not be obtained. On the other hand, if the velocity is too high, beans can be carried from the roasting vessel by the fluid. This not only wastes the beans but can adversely affect the operation of the roasting apparatus.

As pointed out in the companion applications identified above, the need for controlling the velocity of the roasting fluid within close limits can be eliminated and the problem of beans being carried out of a roaster or cooler of the character disclosed in my issued patents nevertheless avoided by using an appropriate deflector. As the beans circulate upwardly, the deflector directs them laterally and downwardly out of the mainstream of the upwardly flowing, process fluid. This insures that they are not carried out of the reactor by the fluid.

A not unrelated benefit of the deflector is that higher flow velocities of the process fluid can be used than would otherwise be the case. This is advantageous in that a greater scouring effect of the fluid on the beans can be obtained. The result is more efficient heat transfer, shorter roasting and cooling times, and corresponding increases in the capacity of the reactors, a decided benefit from the economic viewpoint.

In the roasters described in my previously issued patents, a rotor or rotatable assembly mounted for rotation about a vertical axis displaces the beans from the location where green beans are introduced into the roasting vessel to a second location where roasted beans are discharged. Another feature of the novel roasters and coolers employed in the coffee roasting apparatus described herein is an improved construction of the movable assembly or rotor.

The movable assemblies or rotors described in my U.S. Pat. Nos. 3,615,668; 3,724,909; 3,730,731; 3,763,766 and 3,823,662 have a vertical, cylindrical sleeve to which radial partitions are attached. The rotor cooperates with the shell of the reactor and with a fixed assembly composed of frustoconical inner and outer supports and an annular orifice plate to support the bed of beans.

I have now discovered that significant benefits can be derived by adding to a rotor as described above a cylindrical shroud or wall to which the outer edges of the radial partition are attached. This novel modification strengthens the rotor and facilitates its construction.

Also, dimensional tolerances are much less critical. The need for maintaining the gaps between the vertical partitions of the rotors and the shell of the reactor small enough to keep the beans from passing from one segment of the bed to the next is eliminated as the outer sleeve, not the reactor shell, delineates the outer boundary of the bed.

Also, in the novel rotors disclosed herein and in companion applications Ser. Nos. 628,916 and 628,907 the lower part of the outer sleeve has a downwardly and inwardly inclined, frustoconical configuration; and a similarly configured, but outwardly inclined, cooperating member constitutes the lower end of the inner rotor sleeve. This eliminates the need for the frustoconical supports disclosed in my earlier patents, again producing a simpler and therefore more economical construction.

In the novel rotor construction described above provision is preferably made for keeping beans from falling into the space between the rotor and the reactor shell as they enter the roaster and the cooler. This is easily and inexpensively accomplished by dividing the outer rotor sleeve into a lower member and an upper member spaced inwardly from the lower one. A deflector is fixed to the reactor shell with its lower edge opposite a gap between the upper and lower, outer sleeve members. Any beans which fall outside the upper sleeve member impinge on the deflector and are directed by it into the interior of the movable assembly.

Another optional, but preferred, feature of the roasters and the coolers disclosed herein is a simplified arrangement for supporting and rotating the movable assembly.

In my previously disclosed, continuous roasters the rotor is supported on a large, ringlike bearing. It is rotated by a shaft extending to the exterior of the reactor and carrying a pinion which meshes with an internal ring gear in the rotor.

I have now discovered that this relatively complex arrangement is unnecessary. The rotor can instead be supported by a simple thrust bearing and coupled directly to the drive shaft, eliminating the ring gear and pinion.

The motor and other drive components of the roaster can be mounted on the top of the reactor shell and there drive-connected to the rotor drive shaft; and the rotor of the cooler can be driven by a drive shaft extending through the bottom of the cooler shell and a motor and other drive train components located adjacent the bottom part of the cooler. These novel rotor drive systems facilitate installation and maintenance in the preferred arrangement in which the roaster is located directly above the cooler so that roasted beans can be transferred to the cooler by gravity flow.

Aside from the just-discussed differences in the rotor drives, the roasters and coolers disclosed herein differ in that provision is made for supplying a cooling fluid to the latter rather than a heated roasting fluid. Also, provision is made for introducing a liquid into the reactor in spray form to arrest or quench the roast. In addition, because cooling can generally be carried out without using an inert gas and at atmospheric pressure, a simpler and less expensive cooler shell is preferably employed in the cooler.

The novel coolers described herein are furthermore novel in that the quench liquid is introduced into the lower reaches of the reactor rather than into the upper part thereof as it is in the apparatus shown in my U.S. Pat. Nos. 3,332,780 and 3,447,338. My new arrangement has the important advantage that the liquid is rapidly and completely entrained in the process fluid, producing a faster and more uniform quench of the roast. Also, the system for supplying the quenching liquid is simiplified. simplified.

From the foregoing it will be apparent to the reader that one primary object of the present invention resides in the provision of novel, improved apparatus for roasting coffee by a continuous as opposed to batch-type process.

It will be equally apparent to the reader that another primary object of the invention resides in the provision of continuous coffee roasting systems which are imrovements on those disclosed in my previously issued U.S. Pat. Nos. 3,615,668; 3,724,090; 3,730,731; 3,763,766; and 3,823,662.

Other important but more specific objects of the present invention reside in the provision of coffee roasting systems in which the beans are roasted and cooled with appropriate process fluids in reactors equipped with a movable assembly for displacing the beans during the process cycle and:

1. in which the flow velocity of the process fluid through the reactors is less critical than it has heretofore been;

2. in which higher flow velocities of the fluid can be employed, thereby increasing the capacity of the reactors in which the coffee is roasted and cooled;

3. in which the above-enumerated goals are accomplished by deflecting the coffee beans being processed out of the mainstream of the process fluid so that they will not be carried out of the reactors by the process fluid;

4. in which the goals identified in objects 1, 2, and 3 are accomplished in a simple and economical manner;

5. in which rotors or movable assemblies of improved construction for displacing the beans being processed are provided;

6. in which, in conjunction with the preceding object, the rotors are strong and durable and eliminate the need for maintaining close tolerances between the movable assemblies and the shells of the reactors;

7. in which, in conjunction with object 5, the reactors are simplified by eliminating certain of the components heretofore relied on to effect circulation of the beans during the process cycles;

8. in which the reactors have simplified arrangements for supporting and rotating their movable assemblies;

9. in which a faster and more uniform quench or arrest of the roast is provided;

10. in which, in conjunction with the preceding object, a liquid is introduced into the lower reaches of the cooler in finely divided form and entrained in the process fluid so that it will be rapidly brought into uniform and intimate contact with the hot, roasted beans; and 11. in which various combinations of the foregoing attributes are provided.

Other important objects and features and additional advantages of my invention will become apparent from the appended claims and as the ensuing detailed description and discussion proceeds in conjunction with the accompanying drawing in which:

Figure 2:
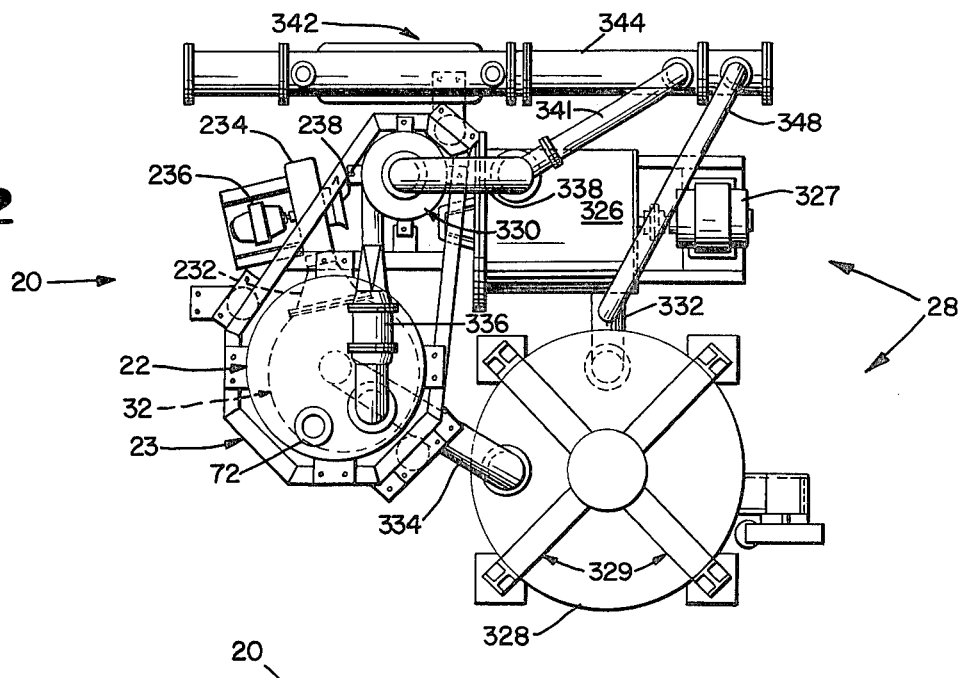
FIG. 2 is a plan view of the apparatus.
Figure 1:
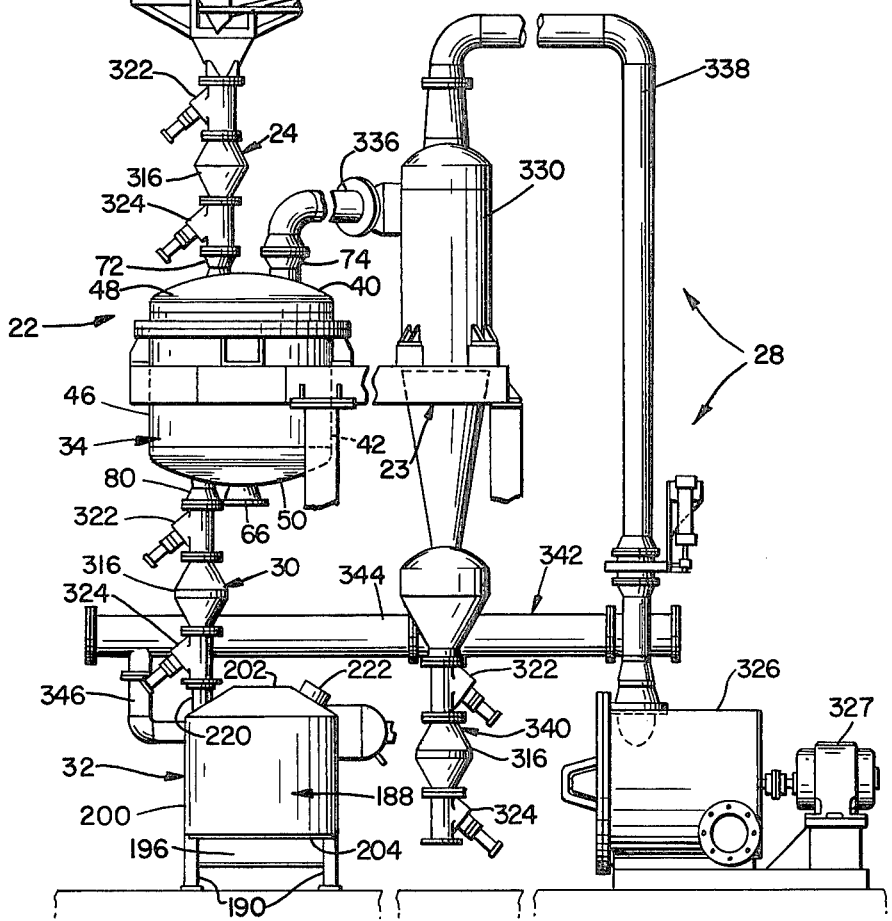
FIG. 1 is an elevation of coffee roasting apparatus constructed in accord with and embodying the principles of the present invention.
Figure 3:
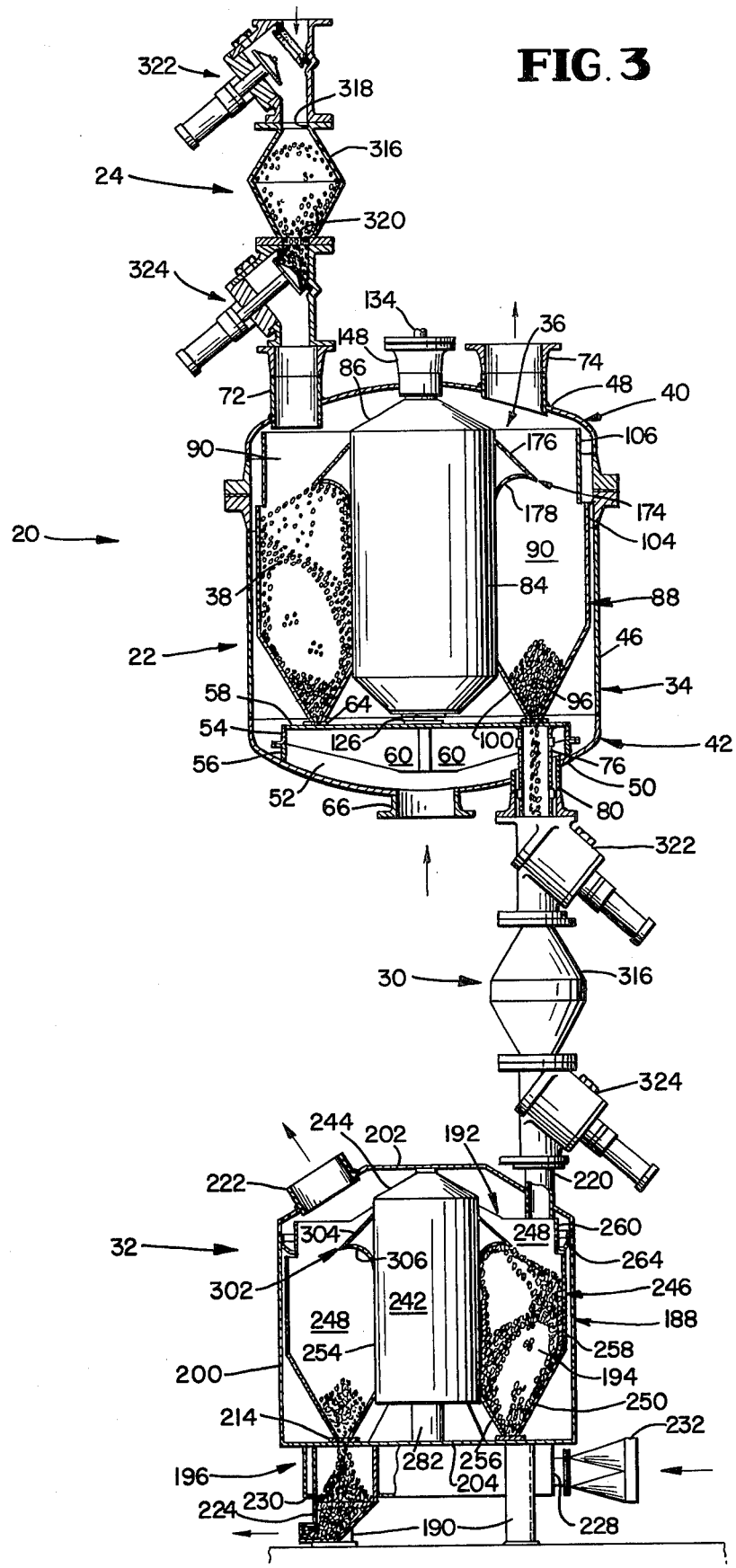
FIG. 3 is a partial and generally diagrammatic vertical section through the apparatus.

Referring now to the drawing, FIGS. 1-3 depict a coffee roasting plant or system 20 constructed in accord with the principles of the present invention. System 20 includes a roasting vessel or reactor 22 supported from a structural framework 23. Unroasted beans are introduced or fed into reactor 22 from a gastight lock 24 supplied with green beans from an automatic, batch weighing scale 26 which may be of the type disclosed in my U.S. Pat. No. 3,016,100 issued Jan. 9, 1962, although it does not have to be. Lock 24 is employed to maintain isolation between the interior of the reactor and the ambient surroundings while the solids are introduced and to remove from the beans before they are roasted any air mixed with them.

The beans thus introduced into the vessel are roasted by a fluid which is heated in and circulated through the roaster by a fluid heating and circulating system 28.

The roasting apparatus also includes a second, gastight lock 30 through which roasted beans are discharged by gravity from the roasting vessel into a second reactor or cooler 32.

Lock 30 cooperates with lock 24 to isolate the roasting vessel from the surrounding environment during roasting and while the transfer of solids is effected so that air will not enter the reactor. Also, roasting fluid associated with the roasted beans can be recovered by evacuating it from lock 30.

In reactor or cooler 32, the roast is quenched; and the roasted beans are cooled. The beans are then typically transferred to a storage bin, packaging equipment, etc.

Figure 4:
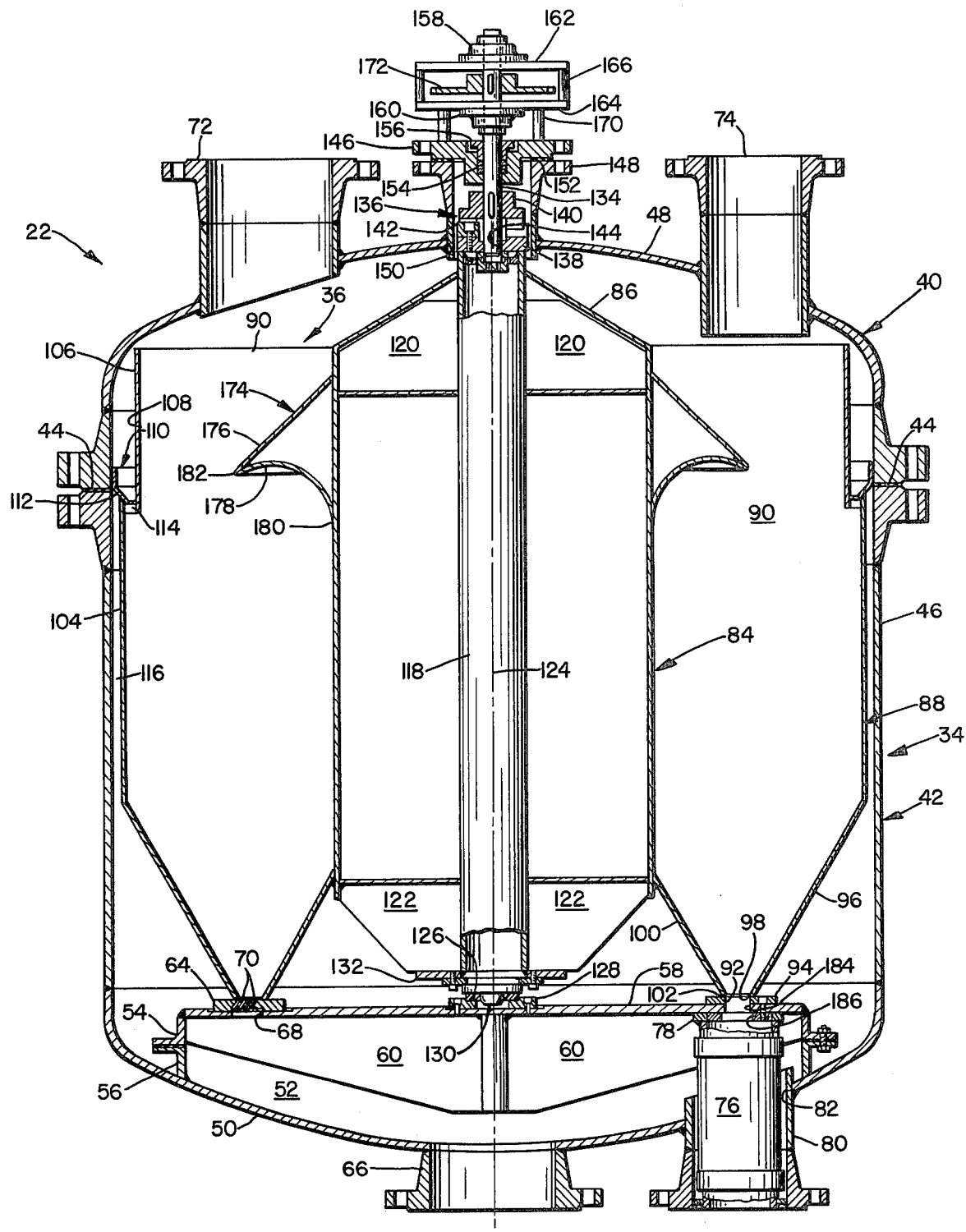
FIG. 4 is a vertical section through a reactor in which the coffee is roasted in the apparatus of FIG. 1.
Figure 5:
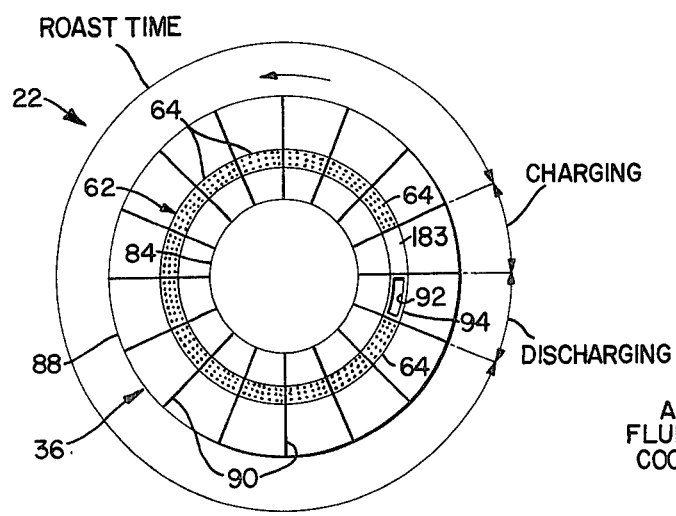
FIG. 5 is a diagrammatic, horizontal section through the reactor of FIG. 4.

Referring now to FIGS. 4 and 5, roaster 22 includes a shell 34 housing a rotatable, movable assembly or rotor 36 which supports a bed 38 of beans (see FIG. 3) during the roasting cycle and displaces the beans from one location where green beans are introduced into the bed to a second location where roasted beans are discharged.

Reactor shell 334 is composed of upper and lower, bolted together, flanged sections 40 and 42 between which a seal 44 is disposed. The reactor shell has a generally cylindrical side wall 46 and top and bottom walls 48 and 50. The precise configuration of the shell is not critical and can be varied to meet the exigencies of a particular application.

The shell will typically be fabricated to withstand pressures well above atmospheric. Pressures on the order of 130-150 psig have proved advantageous in roasting coffee in many cases; and my prior U.S. Pat. No. 3,345,180 issued Oct. 3, 1967, discloses that pressures on the order of 300 psig can also be used to advantage in coffee roasting.

An inlet plenum 52 for a roasting fluid is located in the lower reaches of reactor shell section 42. The plenum is formed by bolted together, angle-sectioned rings 54 and 56 disposed in mirror image relationship and a circular support plate 58. The lower ring 56 is sealed as by welding to the bottom wall 50 of the reactor shell, and plate 58 is similarly fixed to upper ring 54.

Radially extending stiffeners 60 are fixed to the lower side of the support plate 58 and to the upper plenum ring 54. These increase the rigidity of the support plate.

Mounted on support plate 58 is an annular array 62 of nozzle plates 64. Roasting fluid supplied to plenum 52 through inlet 66 flows through openings 68 in plate 58 and through orifices 70 in nozzle plates 64 into the bed of beans 38.

An inlet 72 for green or unroasted beans and an outlet 74 for the roasting fluid communicate with the interior of reactor 22 through the top wall 48 of shell 34.

Roasted beans are discharged from the reactor via a discharge conduit 76 which is a corrugated metal hose in the illustrated embodiment of my invention. The conduit extends from an apertured discharge flange 78 fixed to the lower side of support plate 58 to the exterior of the roaster through a sleeve 80. The sleeve is fixed as by welding in an opening 82 through the bottom wall 50 of reactor shell 34.

The lower end of conduit 76 communicates with the lock 30 through which the roasted beans are transferred to cooler 32 (see FIG. 3).

The rotor housed in shell 34 includes an inner, cylindrical sleeve 84 with a frustoconical cover 86 and an outer, cylndrical sleeve or shroud 88 spaced from the side wall 46 of shell 34. These sleeves delineate the boundaries of bed 38.

Radially oriented partitions 90 extend between and are fixed to the inner and outer sleeves. In the illustrated reactor, there are 16 such partitions (see FIG. 5). They divide the interior of the rotor and the bed 38 of solids therein into 16 equal, radially extending segments to which the beans introduced into them are confined to insure uniform roasting. The partitions also effect displacement of the beans around reactor 22 from inlet 72 to a dump opening 92 as movable assembly 36 is angularly advanced. The dump opening is formed above discharge conduit 76 in an otherwise imperforate segment 94 of nozzle plate array 62.

The lower part 96 of outer sleeve 88 tapers inwardly and terminates in an edge 98 slightly spaced from or in rubbing contact with nozzle plates 64 adjacent the outermost orifices 70. Inner sleeve 84 is composed of two members, the frustoconical lower one 100 tapering outwardly to a lower edge 102 which is also slightly spaced from or in contact with nozzle plates 64 but adjacent the innermost orifices therein. This combination of tapered members confines the upwardly flowing roasting fluid to bed 38 and also forms the bed into a configuration which makes the roasting fluid capable of circulating the beans of which the bed is composed in the pattern shown in FIG. 6.

The outer sleeve 88 of movable assembly 36 is composed of a lower member 104 and a telescoped upper member 106 which is fitted into notches 108 in partitions 90 (see FIG. 4). A sheet metal particle deflector 110 is fixed to the side wall 46 of reactor shell 34 with an inwardly inclined, lower portion 112 thereof extending into the gap 114 between the telescoped shroud members.

This novel arrangement keeps beans supplied to the reactor through inlet 72 from falling into the annular space 116 between rotor 36 and reactor shell 34. Any beans which fall outside upper shroud member 106 drop onto deflector 110 and slide down its inclined part 112 and through gap 114 into the interior of the rotor.

The inner and outer sleeves and radial partitions 90 are assembled into a single unit as by welding. This unit is fixed to a central, hollow, support tube or shaft 118 by radially extending brackets 120 at the upper end of the shaft and by similar brackets 122 at its lower end. These brackets extend between and are fixed to shaft 118 and to inner sleeve 84.

Movable assembly 36 is supported in reactor shell 34 for rotation about vertical axis 124 on a thrust bearing 126. The thrust bearing, which may be a Graphalloy washer, is seated in an adapter ring 128 bolted to the circular support plate 58 in shell 34. A flanged stud 130 bolted to a rotor support plate 132 at the lower end of support shaft 118 extends through the thrust bearing to center or position the lower end of the rotor.

At the upper end of rotor 36 central support shaft 118 is connected to a rotor drive shaft 134 by a clutch 136 which includes a driven or output member 138 fixed to the upper end of shaft 118, a drive element 140 keyed to the lower end of drive shaft 134, and a coupling key 142 which drive connects the two clutch elements (see FIG. 4).

Although not essential, the clutch just described or a comparable arrangement which will permit the drive shaft to be coupled to rotor 36 from the exterior of reactor shell 34 is preferred. This simplifies the assembly of the reactor.

The lower end of drive shaft 134 is seated in a recess 144 in clutch output element 138. This centers the upper end of rotor 36.

Drive shaft 134 extends upwardly through an adapter flange 146 and a flanged sleeve 148 to the exterior of reactor shell 34. Sleeve 148 surrounds the drive shaft and clutch members and is fixed in an opening 150 formed in the top wall 48 of shell 34. A seal 152 between adapter flange 146 and sleeve 148 and packing 154 secured between the flange and shaft 134 by a gland 156 keep roasting fluid from escaping to the exterior of the roaster.

The upper end of drive shaft 134 is rotatably journalled in bearings 158 and 160. These bearings are mounted on plates 162 and 164.

Plate 162 is supported from plate 164 by tubular spacers 166. Plate 164 is similarly supported from adapter flange 146 by spacers 170.

Drive shaft 134 and rotor 36 are rotated about axis 124 via a pinion 172 keyed to the upper end of the drive shaft by an arrangement of the character disclosed in companion application Ser. No. 628,916, which is hereby incorporated herein and which may be referred to by the reader if desired. Because the drive system is described in detail in the foregoing, companion application and because the details are not part of the present invention, the drive system has not been shown herein.

Figure 6:
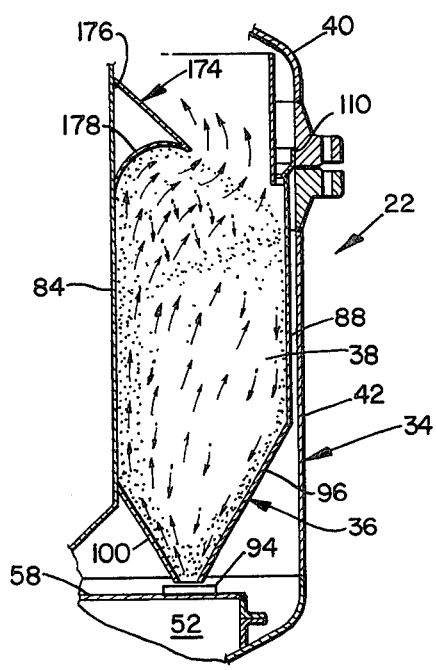
FIG. 6 is a partial and generally diagrammatic vertical section through the reactor showing circulation patterns of the roasting fluid and of the beans being roasted.

In the operation of roaster 22, plenum 52 is supplied with heated roasting fluid through inlet 66. From the plenum, the roasting fluid flows upwardly through nozzles or orifices 70, into and through the bed of beans 38 as shown in FIG. 6, and into outlet duct 74. This causes the beans in each of the segments of bed 38 to circulate in the vertical pattern shown in the same Figure, producing efficient and uniform roasting of the beans.

Unless the velocity of the roasting fluid through the bed is carefully controlled, it may be high enough to carry beans from the bed through outlet 74. As indicated above, this is undesirable because of the loss of product. Also, maintenance problems may be engendered by the entry of beans into roasting gas circulation system 28.

In the illustrated reactor 22 excess exit velocity of the roasting fluid is eliminated as a problem by a novel deflector 174 fixed to the inner sleeve 84 of rotor 36 at the upper end thereof (see FIG. 4). This deflector includes a frustoconical upper member 176 and an arcuately sectioned, annular, lower member 178. The slope of lower member 178 changes from steeply and upwardly inclined at its inner edge 180 to a downward direction at its outer edge 182.

As shown by FIG. 6, the beans moving upwardly in the inner region of bed 38 for the most part continue upwardly until they reach the lower member 178 of deflector 174 and are then directed outwardly and downwardly out of the mainstream of the roasting fluid. Some of the beans will have so little energy after contacting the deflector that they will fall back into bed 38. Those beans having higher velocities will be directed against the outer sleeve 88 of the rotor and rebound into the bed.

It is important, in this regard, that there be sufficient distance between the deflector and the upper surface of the bed that the beans will be deflected against the outer rotor sleeve rather than back against the bed. This keeps the faster moving beans from ricocheting off the bed and back into the stream of exiting roasting fluid.

The precise distance which must be left will of course depend upon the particular application of the invention. It can be readily ascertained by trial and error.

Except as illustrated above, the operation of reactor 22 is essentially identical to that of the reactor disclosed in my U.S. Pat. Nos. 3,730,731 and 3,823,662. Green beans are introduced into an empty segment of rotor 36 located above an imperforate segment 183 in nozzle plate array 62 (see FIG. 5) through inlet 72. Rotor 36 is then angularly indexed by drive shaft 134 to register the just-filled segment with the first of the nozzle plates or segments 64, permitting the heated fluid to flow upwardly through the segment and roast the beans therein. The segment is advanced stepwise, and roasting continues until the segment reaches dump opening 92. Here, the roasted beans drop through the dump opening and then aligned openings 184 and 186 in support plate 58 and discharge flange 78 into discharge conduit 76. As described previously, the roasted beans flow from this conduit through lock 30 into cooler 32 where the roast is arrested and the beans cooled to ambient temperature to complete the process cycle.

Figure 7:
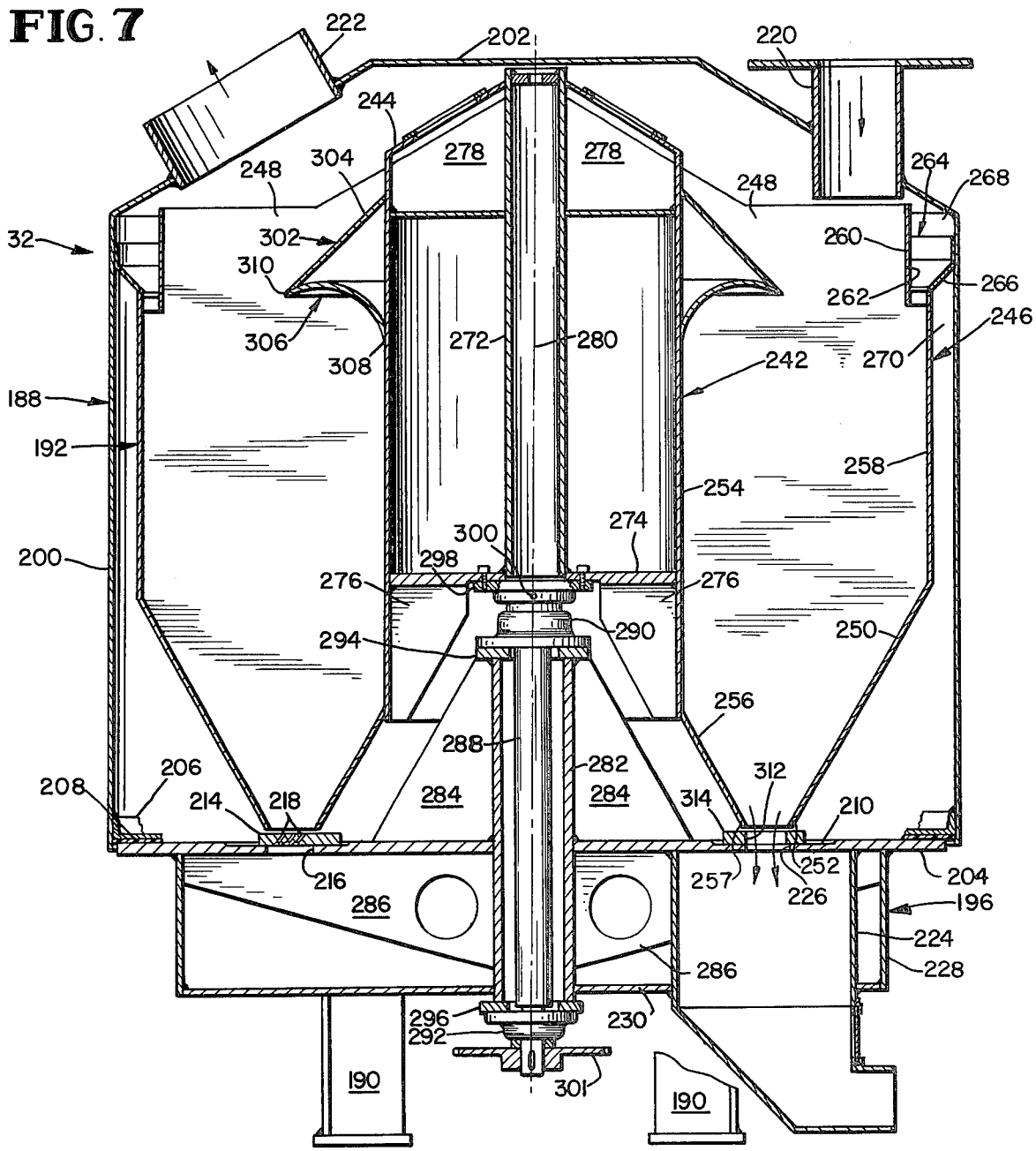
FIG. 7 is a vertical section through a reactor in which the roast is quenched and the roasted coffee cooled in the apparatus of FIG. 1.

Referring now to FIG. 7, cooler 32 includes a shell 188 supported on legs 190 beneath roaster 22. The shell houses a rotatable, movable assembly or rotor 192 which supports a bed of beans 194 (see FIG. 3) during the cooling cycle and displaces the beans from one location where hot, roasted beans are introduced into the bed to a second location where cooled beans are discharged. Also incorporated in reactor 32 are a boxlike, sheet metal plenum 196 from which air or other fluid is introduced into the cooler to effect a patterned circulation of the beans and a system 198 for spraying a liquid such as water into the reactor to rapidly reduce the temperature of the beans and thereby arrest the roast (see FIG. 8).

Reactor shell 188 has a generally cylindrical side wall 200, a frustoconical top wall 202, and a flat bottom wall 204. The precise configuration of the shell is not critical and can be varied to meet the exigencies of a particular application.

The shell can be fabricated of any suitable structural material. Typically, the cooling of coffee beans can be carried out at atmospheric pressure. In this case the top and side walls of the reactor shell can be fabricated of light sheet metal and the load bearing, bottom wall 204 of plate stock.

The side and top walls are supported from bottom wall 204 by an annular, L-sectioned support 206 fixed to the lower edge of the side wall. An annular seal 208 between support 206 and bottom wall 204 keeps process fluid from leaking through the joint between the side and bottom walls.

Figure 9:
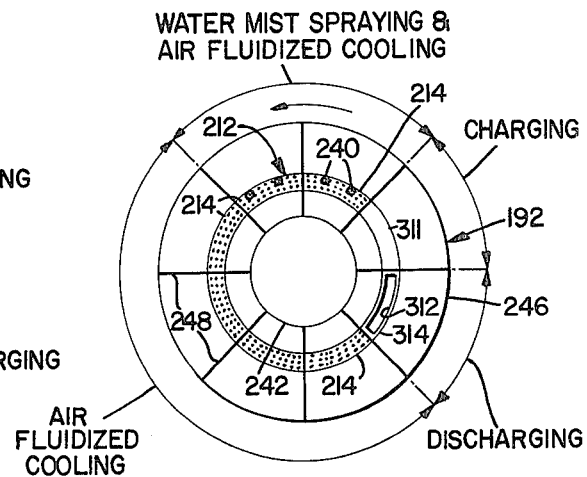
FIG. 9 is a diagrammatic, horizontal section through the reactor of FIG. 7.

Mounted on the bottom wall 204 of reactor shell 188 in a recess 210 is an annular array 212 of nozzle or orifice plates 214 (see FIGS. 7 and 9). Air (or other process fluid) supplied to plenum 196 flows through openings 216 in bottom wall 204 and through orifices 218 in nozzle plates 214 into the bed of beans 194.

An inlet conduit 220 for hot, roasted beans is aligned with the discharge conduit 76 from roaster 22 and with discharge lock 30. Conduit 220 and an outlet duct 222 for the process fluid communicate with the interior of reactor 32 through the top wall 202 of shell 188. The process fluid will typically be free of ecologically harmful contaminants and can accordingly be discharged directly into the ambient surroundings.

Cooled beans are discharged from the reactor via a discharge conduit 224. This conduit communicates with the interior of the reactor through a dump opening 226 in bottom wall 204.

Fluid supply plenum 196 is of simple construction. It includes a side wall 228 fixed to the bottom wall 204 of the reactor shell and a flat bottom wall 230 welded or otherwise fixed to the side wall.

The process fluid is supplied to the plenum through a duct 232 which communicates with the interior of the plenum through side wall 228. As shown in FIG. 2, this duct is connected to the outlet of a circulator or blower 234 driven by a motor 236. The blower inlet 238 is opened to the ambient surroundings or connected to a source of suitable process fluid if air is not employed.

Figure 8:
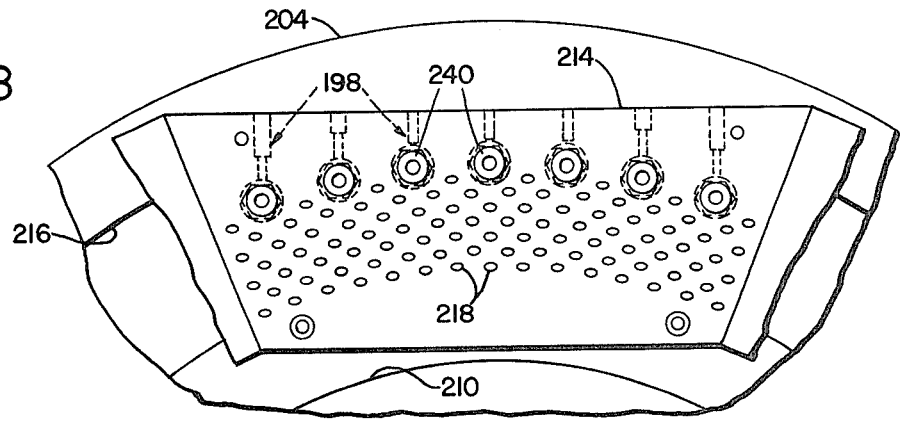
FIG. 8 is a partial horizontal section through the reactor of FIG. 7 showing in fragmentary form a spray system employed to introduce liquid into the reactor in finely divided form.

As shown in FIGS. 8 and 9, the system 198 for spraying liquid into the lower reaches of reactor 32 to arrest the roast includes spray nozzles 240. These nozzles are mounted in orifice plates 214 adjacent the outermost orifices 218. Typically, the tips of the nozzles will be made flush with the upper surfaces of the nozzle plates so that the particles of liquid will be efficiently and rapidly entrained by the process fluid exiting from the upper ends of the orifices.

In the illustrated embodiment of the invention seven nozzles are mounted in each of the first two orifice plates traversed by the roasted beans to arrest the roast as rapidly as possible.

Water, or other liquid, is supplied to those nozzles mounted in each orifice plate 214 from any suitable source through a manifold of appropriate construction. As their details are not critical, these manifolds have not been shown herein.

The rate at which liquid is supplied will of course vary depending upon the application, the size of the reactor, and other factors. In one reactor with a capacity of 3300 pounds per hour, the rate is 4 gallons per hour.

The rotor 192 housed in shell 188 includes an inner, cylindrical sleeve 242 with a frustoconical cover 244 and an outer, cylindrical, sleeve or shroud 246 spaced from the side wall 200 of shell 188. These sleeves delineate the boundaries of bed 194.

Radially oriented partitions 248 extend between and are fixed to the inner and outer sleeves. In the illustrated reactor, there are eight such partitions. They divide the interior of the rotor and the bed 194 of beans therein into eight equal, radially extending segments to which the beans are confined to insure uniform treatment. The partitions also effect displacement of the beans around reactor 32 from inlet 220 to dump opening 226 as movable assembly 192 is angularly advanced or rotated. Only half as many segments are formed in cooler rotor 192 as in roaster rotor 36 because the cooling of the hot, roasted beans and the arrest of the roast typically take only about one half the time required to roast the beans.

The lower part 250 of outer rotor sleeve 246 tapers inwardly and terminates in an edge 252 slightly spaced from or in rubbing contact with nozzle plates 214 adjacent the outermost orifices 218 (see FIG. 7).

Inner sleeve 242 is composed of two members 254 and 256. Upper member 254 has a cylindrical configuration. The bottom edge 257 of the lower member, which is frustoconical and tapers outwardly and downwardly, is also spaced slightly from or in rubbing contact with the nozzle plates but adjacent the innermost rather than the outermost orifices.

Figure 10:
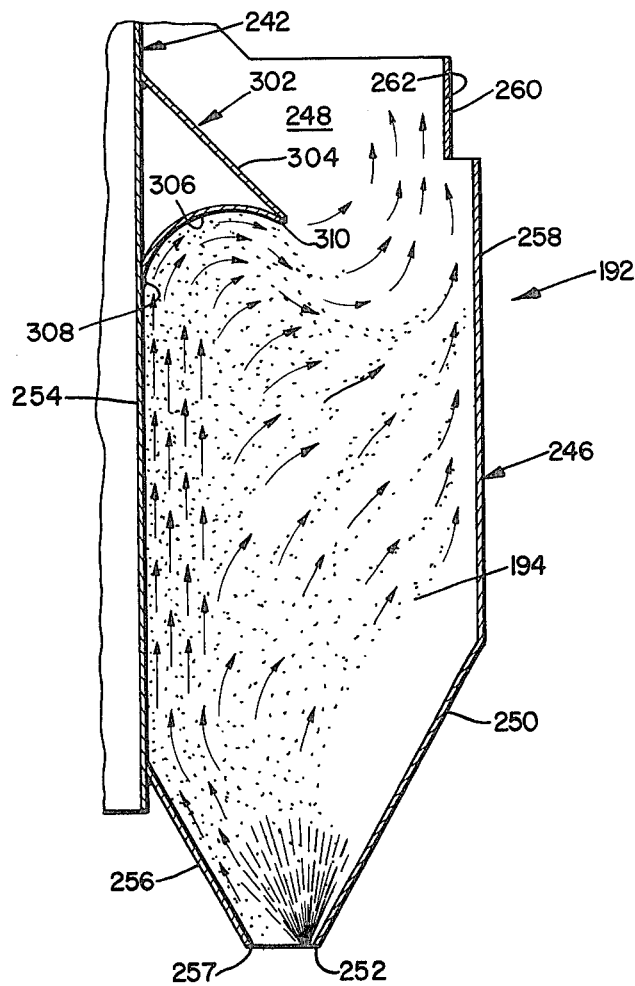
FIG. 10 is a partial and generally diagrammatic vertical section through the reactor of FIG. 7 which shows the flow patterns of the process fluid and the spray from the quench liquid supply system and the circulation pattern of the solids being processed.

This combination of inner and outer, frustoconically tapered members confines the upwardly flowing process fluid to bed 194 and also forms the bed into a configuration which makes the process fluid capable of circulating the beans of which the bed is composed in the pattern shown in FIG. 10. The outer sleeve 246 of movable assembly 192 is composed of a lower member 258 and a telescoped upper member 260 which is fitted into notches 262 in partitions 248. An annular, sheet metal, bean deflector 264 is fixed to the side wall 200 of reactor shell 188 with an inwardly inclined, lower portion 266 thereof extending into the gap 268 between the telescoped members.

This novel arrangement keeps beans supplied to the reactor through inlet 220 from falling into the annular space 270 between rotor 192 and reactor shell 188. Any beans which fall outside the upper member 260 drop onto deflector 264 and slide down its inclined part 266 and through gap 268 into the interior of the movable assembly.

Toward its lower end, inner sleeve 242 of the movable assembly is fixed to a hollow, vertical, capped tube or shaft 272 by an annular, load bearing, disclike support 274. Radially oriented, sheet metal stiffeners 276 are fixed to the lower side of support 274 and to sleeve 242 to increase the rigidity and strength of the sleeve and the connection between it and tube 272.

The upper end of sleeve 242 is also fixed to shaft 272. Here, radially extending, flanged brackets 278 connect the components.

Movable assembly 192 is supported in shell 188 for rotation about a vertical axis 280 on a tubular support or tube 282. The support extends through the bottom wall 204 of shell 188 and plenum 196 to the exterior of the reactor. Radially oriented brackets 284 fixed to support 282 and to the top of bottom wall 204 and radial brackets 286 in plenum 196 also fixed to support 282 and wall 204 rigidly support tube 282 from reactor shell 188.

A drive shaft 288 for angularly advancing rotor 192 is supported in tube 282 for rotation about the same vertical axis 280 as rotor 192 by flanged bearings 290 and 292. Bearing 290 is mounted on a plate 294 fixed to the upper end of support tube 282. Lower bearing 292 is attached to a plate 296 fixed to the lower end of the support.

Shaft 288 is drive-connected to rotor 192 through a coupling 298 bolted to lower rotor support 274 and a pin 300. The pin extends through the shaft and coupling to rotatably connect them together.

Drive shaft 288 is rotated via a pinion 301 fixed to its lower end by a drive system of the character disclosed in companion application Ser. No. 628,907, which is hereby incorporated by reference. Because a detailed discussion of the drive system is not necessary to an understanding of the present invention and because such discussion is found in the foregoing application, it will not be repeated herein.

In the operation of cooler 32, plenum 196 is supplied with process fluid through supply duct 232. From the plenum, the fluid flows upwardly through nozzle plates 214, into and through the bed of beans 194 as shown in dotted lines in FIG. 10, and into outlet 222. This causes the beans in each of the segments of bed 194 to circulate in the vertical pattern shown in FIG. 10, producting efficient and uniform contact between the fluid and the beans.

The process fluid also entrains and brings the liquid sprayed into the reactor through nozzles 240 into intimate and uniform contact with the hot beans in the initial stages of the cooling cycle as shown by the liquid flow pattern in FIG. 10. This is important both because it effects an efficient transfer of heat from the beans to the liquid and because it results in a uniform quench of the roast.

As indicated above, excess velocity of the process fluid has heretofore been a problem in reactors in which solids are circulated in a vertical pattern of the character shown in my issued patents. In reactor 32 this problem is eliminated by a novel deflector 302 fixed to the inner sleeve 242 of rotor 192 at the upper end thereof. This deflector includes a frustoconical upper member 304 and an arcuately sectioned, lower member 306. The slope of lower member 306 changes from steeply and upwardly inclined at its inner edge 308 to a downward direction at its outer edge 310.

As shown in FIG. 10, the beans moving upwardly in the inner region of bed 194 for the most part continue upwardly until they reach the lower member 306 of deflector 302 where they are directed outwardly and downwardly out of the mainstream of the process fluid. Some of the beans will have so little energy after contacting the deflector that they will fall back into bed 194. Those beans having higher velocities will be directed against the outer sleeve 246 of the rotor and rebound into the bed.

It is important, in this regard, that there be sufficient distance between the deflector in reactor 32 and the upper surface of bed 194 that the beans will be deflected against the outer sleeve 246 of rotor 192 rather than back against the bed. This keeps the faster moving beans from ricocheting off the bed and back into the stream of exiting fluid. The precise distance which must be left will of course depend upon the particular application of the invention. It can be readily ascertained by trial and error.

To complete the description of the manner in which reactor 32 operates, roasted beans are introduced into an empty segment of rotor 192 defined by two adjacent partitions 248 and located above an imperforate segment 311 of nozzle plate array 212 (see FIG. 9) through inlet 220. Rotor 192 is then angularly indexed by rotating drive shaft 288 to register the just-filled segment with the first of the nozzle plates 214, permitting the process fluid and spray to flow upwardly through the segment and quench the roast of the beans therein. The segment is then advanced stepwise to the second orifice plate 214, where the quench is completed, and then to the remaining orifice plates 214 where cooling continues.

Finally, the segment reaches dump opening 226. Here, the cooled, roasted beans drop through an opening 312 in an otherwise imperforate plate 314 in annular array 212 and through dump opening 226 into discharge conduit 224. From this conduit, the beans are transferred to a packaging or other operation.

Locks 24 and 30, best shown in FIG. 3, are described in detail in my U.S. Pat. Nos. 3,730,731 and 3,763,766; and this description will not be repeated herein. Briefly, however, each of these locks include a gastight hopper 316 with an inlet 318 and an outlet 320. Valves 322 and 324 (preferably poppet valves of the construction disclosed in the foregoing patents and in my U.S. Pat. No. 3,825,221 issued July 23, 1974, are provided to control flow through the inlet 318 and outlet 320 of each lock and to isolate its hopper 316 so that air can be evacuated or roasting fluid recovered from it.

As shown in FIGS. 1 and 2, the system 28 employed in coffee roasting apparatus 20 to heat the roasting fluid includes a blower 326, driven by a motor 327, for circulating the heated fluid through reactor 22; a direct fired heater 328 for the fluid supported from a framework 329; and a chaff separator 330 supported from framework 23. Blower 326 circulates the roasting fluid through duct 332 to heater 328 where the fluid is heated to the desired temperature, typically on the order of 400° F+. From here the heated fluid flows through duct 334 to roasting vessel 22 and then through the latter in the manner described previously.

The roasting fluid, then at a lower temperature and having admixed therewith moisture and other volatiles evolved from the beans during the roasting process, foreign matter, etc. flows through duct 336 to chaff separator 330, which is of conventional construction and accordingly will not be described in detail herein. Here chaff and other foreign material is separated from the roasted solids. The cleaned roasting fluid flows from the chaff separator through duct 338 back to blower 326 to complete the cycle.

Because system 28 is pressurized and filled with inert fluid, chaff separator 330 is equipped with a lock 340 of the same character as locks 24 and 30 so that accumulated chaff may be removed without losing roasting fluid and without air entering the system.

Moisture evolved in the roasting process must be continuously removed from the recirculated roasting fluid in typical applications of my invention to prevent the moisture content of the latter from exceeding an acceptable level. Regulation of the moisture content is accomplished by circulating a portion of the roasting fluid from duct 338 through duct 341 to condenser 342 to remove excess moisture from the recirculating fluid.

Condensor 342 is of conventional construction and accordingly will not be described in detail herein. Briefly, however, it includes a shell 344 housing a coil (not shown) through which a coolant (typically ambient temperature water) is circulated. The roasting fluid flows through shell 344 over the coil. This lowers its temperature, condensing the water vapor in the fluid. The water is separated and discharged through drain conduit 346.

The roasting fluid from which the moisture has been separated flows through duct 348 to duct 332 where it is mixed with the roasting fluid flowing directly to heater 328 through the latter. This permits the moisture content to be accurately controlled.

In addition to those components shown in the drawing and described above, coffee roasting system 20 in actual practice includes a system for controlling the environment in locks 24, 30, and 340 and for keeping air from entering or roasting fluid from escaping from roasting vessel 22 or circulation system 28 as unroasted beans are introduced into and roasted beans discharged from roasting vessel 22 and as chaff is removed from chaff separator 330. This conserves the roasting fluid and allows the beans to be roasted in an environment of controlled composition or controlled composition and above atmospheric pressure.

This system may be as described in my previously issued U.S. Pat. Nos. 3,730,731 and 3,763,766 which are hereby incorporated by reference. Because a suitable system is described in the foregoing patents and because the details of the system are not part of the present invention, the system has not been shown herein.

Other controls for regulating the operation of plant 20 will also be provided in actual practice. The more important and less obvious of these are also described in U.S. Pat. Nos. 3,730,731 and 3,763,766 to which the reader may refer, if desired.

It will be obvious to those skilled in the arts to which this invention pertains that many modifications may be made in the embodiment of the invention described above to optimize its performance for particular applications or for other reasons. Furthermore, it will be readily apparent to such persons that the principles of the invention and the illustrated apparatus, particularly the novel reactors disclosed herein, can be used for applications other than coffee roasting. All such applications and modifications of the present invention and the apparatus and processes employing its principles are therefore intended to be covered by the appended claims unless expressly excluded therefrom.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. Apparatus for roasting coffee and the like which comprises: first and second reactors, each of which includes a shell, means in said shell comprising a movable assembly for supporting the beans to be processed therein, means for rotating the movable assembly about a vertical axis to thereby displace the beans in the reactor from a first location in said reactor to a second location therein, an inlet means above the movable assembly through which beans can be charged into said assembly, and deflector means for keeping beans from falling between the movable assembly and the reactor shell, said movable assembly having an outer wall means which includes a first member and a second member spaced inwardly from and extending above the first member and said deflector means extending inwardly from said shell to said outer wall means to direct beans falling outside the movable assembly through the gap between the first and second members of the outer wall means into the interior of the movable assembly; means for introducing coffee beans into said first reactor at one location; means for roasting said beans as they are displaced from the first to the second of said locations in said first reactor by so effecting a flow of roasting fluid upwardly through the first reactor that the beans circulate into intimate and uniform contact with the roasting fluid; means for discharging roasted beans from the first reactor at said second location and into the second reactor at the first location therein; means for cooling the roasted beans as they are displaced from the first location to the second location in said second reactor by so effecting a flow of fluid upwardly through the second reactor that the roasted beans circulate into intimate and uniform contact with the fluid; and means for discharging cooled beans from the second reactor at the second location therein.

2. Apparatus as defined in claim 1, together with means for introducing a finely divided liquid into the lower reaches of the second reactor and into contact with the hot, roasted beans in said reactor to arrest the roast of said beans.

3. Apparatus for roasting coffee and the like which comprises: first and second reactors, the second reactor including a movable assembly which is rotatable about a vertical axis for supporting the roasted beans being processed therein, and means for rotating the movable assembly about said vertical axis to thereby displace the beans from a first location in said second reactor to a second location therein; means for introducing coffee beans into said first reactor at a first location therein; means for displacing said beans from said first location to a second location in said first reactor; means for roasting said beans as they are displaced from the first to the second of said locations in said first reactor by so effecting a flow of roasting fluid upwardly through the reactor that the beans circulate into intimate and uniform contact with the roasting fluid; means for discharging roasted beans from the first reactor at said second location and into the second reactor at a first location therein; means for cooling the roasted beans as they are displaced from the first location to the second location in said second reactor by so effecting a flow of fluid upwardly through the second reactor that the roasted beans circulate into intimate and uniform contact with the fluid, said means comprising a series of apertured, horizontally oriented segments mounted in the lower reaches of said second reactor and extending from said first location therein toward said second location therein; means for introducing finely divided liquid into the lower reaches of the second reactor and into contact with the hot, roasted beans in said reactor to arrest the roast of said beans, said means comprising nozzles associated with the passages through at least the first of said apertured segments for spraying the liquid into the reactor adjacent said passages so that the particles of the liquid will be entrained in the fluid and thereby brought into intimate contact with the beans; and means for discharging cooled beans from the second reactor at the second location therein.

4. Apparatus for roasting coffee and the like which comprises: first and second reactors; means for introducing coffee beans into said first reactor at a first location therein; means for displacing said beans from said first location in said first reactor to a second location therein; means for roasting said beans as they are displaced from the first to the second of said locations by so effecting a flow of roasting fluid upwardly through the reactor that the beans circulate into intimate and uniform contact with the roasting fluid; means for discharging roasted beans from the first reactor at said second location and into the second reactor at a first location therein; means for displacing the roasted beans from the first location in the second reactor to a second location therein; means for cooling the roasted beans as they are displaced from the first location in said second reactor to the second location therein by so effecting a flow of fluid upwardly through the second reactor that the roasted beans circulate into intimate and uniform contact with the fluid, said means comprising a horizontally oriented means having fluid passages therethrough which is mounted in the lower reaches of the reactor, a plenum disposed beneath the shell of said reactor, means providing communication between the interior of the shell and the plenum through the bottom wall of the shell, and means for introducing the fluid into the plenum; means for introducing a finely divided liquid into the lower reaches of the second reactor and into contact with the hot, roasted beans in said reactor to arrest the roast of said beans, said means comprising nozzles for spraying the liquid into the reactor adjacent said passages so that the particles of the liquid will be entrained in the process fluid and thereby brought into intimate contact with the beans; and means for discharging cooled beans from the second reactor at the second location therein.

5. Apparatus for roasting coffee and the like which comprises: first and second reactors, each of which includes a movable assembly for supporting a bed of beans being processed therein and means for rotating said assembly to thereby displace the beans being treated in each of said reactors from a first to a second location therein, the movable assembly of each of said reactors including an inner, cylindrical, wall means, an outer cylindrical, wall means, and radial partitions extending between said inner and outer wall means and dividing the space between the inner and outer wall means and the bed of beans delineated thereby into a plurality of radially extending segments; means for introducing coffee beans into said first reactor at the first location therein; means for roasting said beans as they are displaced from the first to the second of said locations in said first reactor by so effecting a flow of roasting fluid upwardly through the reactor that the beans circulate into intimate and uniform contact with the roasting fluid; means for discharging roasted beans from the first reactor at said second location and into the second reactor at said first location therein; means for cooling the roasted beans as they are displaced from the first location in said second reactor to the second location therein by so effecting a flow of fluid upwardly through the second reactor that the roasted beans circulate into intimate and uniform contact with the fluid; and means for discharging cooled beans from the second reactor at the second location therein; the numbers of partitions in the movable assemblies of the roaster and the cooler being such that the ratio of the numbers of segments into which the interiors of the rotors are divided by said partitions approximates the ratio of the durations of the process cycles carried out in said roaster and in said cooler.

6. Apparatus as defined in claim 5, wherein each of the reactors includes a fluid inlet means for process fluid, said fluid inlet means being disposed adjacent the lower end of the movable assembly of the reactor, and the lower portions of the inner and outer wall means of said assembly converging toward and terminating adjacent said inlet means whereby process fluid flowing through said inlet means will flow upwardly as aforesaid through said movable assembly and the beans supported by the assembly.

7. Apparatus for roasting coffee and the like which comprises: first and second reactors, each of which includes a shell, a movable assembly in said shell for supporting the beans being processed therein, and means for supporting and rotating the movable assembly to displace the beans supported thereby from a first location in each said reactor to a second location therein; means for introducing coffee beans into said first reactor at said first location therein; means for roasting said beans as they are displaced from the first to the second of said locations in said first reactor by so effecting a flow of roasting fluid upwardly through the reactor that the beans circulate into intimate and uniform contact with the roasting fluid; means for discharging roasted beans from the first reactor at said second location and into the second reactor at said first location therein; means for cooling the roasted beans as they are displaced from the first location to the second location in said second reactor by so effecting a flow of fluid upwardly through the second reactor that the roasted beans circulate into intimate and uniform contact with the fluid; and means for discharging cooled beans from the second reactor at the second location therein, said first reactor being located above said second reactor; the means for supporting and rotating the movable assembly of the first reactor including a shaft extending upwardly through its shell to the exterior thereof, means for rotating said shaft, and means connecting said movable assembly of said reactor to the shaft for rotation therewith; and the means for supporting and rotating the movable assembly of the second reactor including a drive shaft extending through the bottom of its shell to the exterior thereof, means for rotating said drive shaft, coupling means connecting the movable assembly of the second reactor to said drive shaft for rotation therewith, a hollow, vertical support fixed to and extending to the exterior of the reactor shell through the bottom thereof, and bearings attached, respectively, to the upper and lower ends of said support; the drive shaft for the movable assembly of the second reactor being housed within said hollow vertical support.

8. Apparatus as defined in claim 7, wherein the means connecting the movable assembly of the first reactor to the drive shaft therefor includes a driven element rotatable with the movable assembly and accessible from the exterior of the reactor shell and a drive element rotatable with said drive shaft and engageable with said driven element to provide a drive connection therebetween.

9. Apparatus as defined in claim 7, together with means mounting each of said drive shafts for rotation about an axis coincident with the axis of rotation of the movable assembly with which it is associated.

10. Apparatus as defined in claim 7, which includes a thrust bearing in the shell of the first reactor which supports the movable assembly of said reactor for rotation about a vertical axis and means at the lower end of said movable assembly which is engageable with said thrust bearing to center said movable assembly in the reactor shell.

11. Apparatus as defined in claim 10, together with a horizontally oriented support means in the lower reaches of the reactor shell of said first reactor for said thrust bearing and means cooperating with said support means and the reactor shell and extending therebetween to form an inlet plenum for the process fluid.

12. Apparatus as defined in claim 11, in which the means for effecting the flow of fluid upwardly through the reactor shell comprises a nozzle plate means supported by said support means and communicating therethrough with the fluid inlet plenum.

13. Apparatus for roasting coffee and the like which comprises: first and second reactors; means for introducing coffee beans into said first reactor at a first location; means for displacing said beans from said first location to a second location; means for roasting said beans as they are displaced from the first to the second of said locations by so effecting a flow of roasting fluid upwardly through the reactor that the beans circulate into intimate and uniform contact with the roasting fluid; means for discharging roasted beans from the first reactor at said second location and into the second reactor at a first location therein; means for displacing the roasted beans from the first location in the second reactor in a generally horizontal path around the reactor to a second location therein; means for cooling the roasted beans as they are displaced from the first location to the second location by so effecting a flow of process fluid upwardly through the second reactor that the roasted beans circulate into intimate and uniform contact with the fluid comprising a horizontally oriented means having fluid passages therethrough mounted in the lower reaches of the reactor; means for introducing a finely divided liquid into the lower reaches of the second reactor and into contact with the hot, roasted beans in said reactor to arrest the roast of said beans comprising nozzles for spraying the liquid into the reactor adjacent said passages so that the particles of the liquid will be entrained in the process fluid and thereby brought into intimate contact with the beans; and means for discharging cooled beans from the second reactor at the second location therein.

14. Apparatus as defined in claim 1, wherein each of said reactors includes a deflector means in the upper reaches of the reactor shell for directing the beans being treated in the reactor out of the mainstream of the fluid flowing upwardly therethrough to thereby keep said beans from being carried out of the reactor by the fluid.

15. Apparatus as defined in claim 14 in which each said deflector means has a horizontally oriented, curved lower surface which changes in slope between a steeply and upwardly inclined inner edge and a downwardly inclined, outer edge.

16. Apparatus as defined in claim 7, wherein the movable assembly of each of said reactors includes an inner, cylindrical, wall means; an outer, cylindrical, wall means; and radial partitions extending between said inner and outer wall means and dividing the space between the inner and outer wall means and the bed of beans delineated thereby into a plurality of radially extending segments.

* * * * *

UNITED STATES PATENT OFFICE
CERTIFICATE OF CORRECTION

Patent No. 4,096,792     Dated June 27, 1978

Inventor(s) HORACE L. SMITH, JR.

It is certified that error appears in the above-identified patent and that said Letters Patent are hereby corrected as shown below:

Change claim 23 to read as follows:

--23. Apparatus for roasting coffee beans and the like which comprises: first and second reactors, each of which includes a shell, means in said shell comprising a movable assembly for supporting the beans to be processed therein; means for rotating the movable assembly about a vertical axis to thereby displace the beans in the reactor from a first location in said reactor to a second location therein, an inlet means above the movable assembly through which beans can be charged into said assembly, and deflector means for keeping beans from falling between the movable assembly and the reactor shell, said movable assembly having an outer wall means which includes a first member and a second member spaced inwardly from and extending above the first member and said deflector means extending inwardly from said shell to said outer wall means to direct beans falling outside the movable assembly through the gap between the first and second members of the outer wall means into the interior of the movable assembly; means including an inlet means as aforesaid for introducing coffee beans into the movable assembly of said first reactor at the first location therein; means for roasting said beans as they are displaced from the first to the second of said locations in said first reactor by so effecting a flow of roasting fluid upwardly through the first reactor that the beans circulate into intimate and uniform contact with the roasting fluid; means for discharging roasted beans from the first reactor at said second location and into the second reactor at the first location therein; means for cooling the roasted beans as they are displaced from the first location to the second location in said second reactor by so effecting a flow of fluid upwardly through the second reactor that the roasted beans circulate into intimate and uniform contact with the fluid; and means for discharging cooled beans from the second reactor at the second location therein.--.

UNITED STATES PATENT OFFICE
CERTIFICATE OF CORRECTION

Patent No. 4,096,792  Dated June 27, 1978

Inventor(s) HORACE L. SMITH, JR.

It is certified that error appears in the above-identified patent and that said Letters Patent are hereby corrected as shown below:

Column 15, line 8, after "coffee" insert --beans--.

Column 15, line 11, cancel "the".

Change claim 26 to read as follows:

--26. Apparatus for roasting coffee beans and the like which comprises: first and second reactors; means for introducing coffee beans into said first reactor at a first location therein; means for displacing said beams from said first location in said first reactor to a second location therein; means for roasting said beans as they are displaced from the first to the second of said locations by so effecting a flow of roasting fluid upwardly through the reactor that the beans circulate into intimate and uniform contact with the roasting fluid; means for discharging roasted beans from the first reactor at said second location and into the second reactor at a first location therein; means for displacing the roasted beans from the first location in the second reactor to a second location therein; means for cooling the roasted beans as they are displaced from the first location in said second reactor to the second location therein by so effecting a flow of fluid upwardly through the second reactor that the roasted beans circulate into intimate and uniform contact with the fluid, said second reactor comprising a vertically oriented shell having a bottom wall and the means for effecting a flow of fluid upwardly through the second reactor comprising a horizontally oriented means having fluid passages therethrough which is mounted in the lower reaches of the reactor, a plenum disposed beneath the shell of said reactor, means providing communication between the interior of the shell and the plenum through the bottom wall of the shell, and means for

UNITED STATES PATENT OFFICE
CERTIFICATE OF CORRECTION

Patent No. 4,096,792          Dated June 27, 1978

Inventor(s) HORACE L. SMITH, JR.

It is certified that error appears in the above-identified patent and that said Letters Patent are hereby corrected as shown below:

Continuation of Claim 26:

introducing the fluid into the plenum; means for introducing a finely divided liquid into the lower reaches of the second reactor and into contact with the hot, roasted beans in said reactor to arrest the roast of said beans, said means comprising nozzles for spraying the liquid into the reactor adjacent said passages so that the particles of the liquid will be entrained in the process fluid and thereby brought into intimate contact with the beans; and means for discharging cooled beans from the second reactor at the second location therein.--

Change Claim 27 to read as follows:

--27. Apparatus for roasting coffee beans and the like which comprises: first and second reactors, each of which includes a movable assembly for supporting a bed of beans being processed therein and means for rotating said assembly to thereby displace the beans being treated in the reactor from a first to a second location therein, the movable assembly of each of said reactor including an inner, cylindrical, wall means, an outer cylindrical, wall means, and radial partitions extending between said inner and outer wall means and dividing the space between the inner and outer wall means and the bed of beans delineated thereby into a plurality of radially extending segments; means for introducing coffee beans into said first reactor at the first location therein; means for roasting said beans as they are displaced from the first to the second of said locations in said first reactor by so effecting a flow of roasting fluid upwardly through the reactor that the beans circulate into intimate and uniform contact with the roasting fluid; means for discharging roasted beans from

UNITED STATES PATENT OFFICE
CERTIFICATE OF CORRECTION

Patent No. 4,096,792  Dated June 27, 1978

Inventor(s) HORACE L. SMITH, JR.

It is certified that error appears in the above-identified patent and that said Letters Patent are hereby corrected as shown below:

Cont. of Claim 27:

the first reactor at said second location and into the second reactor at said first location therein; means for cooling the roasted beans as they are displaced from the first location in said second reactor to the second location therein by so effecting a flow of fluid upwardly through the second reactor that the roasted beans circulate into intimate and uniform contact with the fluid; and means for discharging cooled beans from the second reactor at the second location therein; the numbers of partitions in the movable assemblies of the first and second reactors being such that the ratio of the numbers of segments into which the interiors of the movable assemblies of said reactors are divided by said partitions approximates the ratio of the durations of the process cycles carried out in, respectively, said first reactor and in said second reactor.--.

Column 16, line 59, after "coffee" insert --beans--.

Column 18, line 8, after "coffee" insert --beans--.

Column 18, line 11, after "location" insert --therein--.

Column 18, line 12 after "location" second occurrence, insert --therein--.

Signed and Sealed this

Second Day of January 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,096,792
DATED : June 27, 1978
INVENTOR(S) : Horace L. Smith, Jr.

It is certified that error appears in the above-identified patent and that said Letters Patent are hereby corrected as shown below:

Column 4, line 43, delete "simiplified."

Column 4, lines 51 and 52, change "im-rovements" to --im-provements--.

Column 6, line 31, change "334" to --34--.

Column 7, line 8, change "cylndrical" to --cylindrical--.

Signed and Sealed this

Sixteenth Day of October 1979

[SEAL]

Attest:

RUTH C. MASON
Attesting Officer

LUTRELLE F. PARKER
Acting Commissioner of Patents and Trademarks